(12) United States Patent
Mizukoshi

(10) Patent No.: US 8,737,356 B2
(45) Date of Patent: May 27, 2014

(54) WIRELESS COMMUNICATION SYSTEM AND METHOD OF CONDUCTING WIRELESS COMMUNICATION

(75) Inventor: Yasuhiro Mizukoshi, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 13/554,668

(22) Filed: Jul. 20, 2012

(65) Prior Publication Data

US 2012/0300729 A1    Nov. 29, 2012

Related U.S. Application Data

(60) Continuation of application No. 11/634,187, filed on Dec. 6, 2006, now Pat. No. 8,249,090, which is a division of application No. 09/984,129, filed on Oct. 29, 2001, now Pat. No. 7,177,292.

(30) Foreign Application Priority Data

Oct. 27, 2000   (JP) ................................. 2000-328847

(51) Int. Cl.
    H04W 4/00             (2009.01)
(52) U.S. Cl.
    USPC ..... 370/331; 370/338; 370/395.2; 370/395.3; 370/401
(58) Field of Classification Search
    USPC ................ 370/329, 330, 331, 338, 401, 469, 370/395.2, 395.3
    See application file for complete search history.

(56) References Cited

U.S. PATENT DOCUMENTS

| | | | |
|---|---|---|---|
| 4,991,171 | A | 2/1991 | Teraslinna et al. |
| 5,726,984 | A | 3/1998 | Kubler et al. |
| 5,787,360 | A | 7/1998 | Johnston et al. |
| 5,845,192 | A | 12/1998 | Saunders |
| 6,163,532 | A | 12/2000 | Taguchi |
| 6,230,012 | B1 | 5/2001 | Willkie et al. |
| 6,272,148 | B1 * | 8/2001 | Takagi et al. ............... 370/469 |

(Continued)

FOREIGN PATENT DOCUMENTS

| | | |
|---|---|---|
| EP | 0 828 398 | 3/1998 |
| EP | 0 917 328 | 5/1999 |

(Continued)

OTHER PUBLICATIONS

McGregor, G.: The PPP Internet Protocol Control Protocol (IPCP), The PPP Internet Protocol (IPCP), May 1992, XP-002123909.

*Primary Examiner* — Christopher Grey

(74) *Attorney, Agent, or Firm* — Young & Thompson

(57) ABSTRACT

A wireless communication system includes a plurality of base stations, a mobile wireless communication device which makes wireless communication with the base stations, a terminal device, and a router through which the base stations make communication with an IP network. The terminal device transmits an address thereof to the mobile wireless communication device, before the mobile wireless communication device makes link with one of the base stations. The terminal device fabricates a frame addressed to an address of the router, and transmits the frame to the router, after the mobile wireless communication device has made link with one of the base stations. The router transmits an address thereof to the base stations, before the mobile wireless communication device makes link with one of the base stations. The router fabricates a frame addressed to an address of the terminal device, and transmits the frame to the terminal device, after the mobile wireless communication device has made link with one of the base stations.

12 Claims, 9 Drawing Sheets

(56) References Cited

U.S. PATENT DOCUMENTS

| | | |
|---|---|---|
| 6,424,639 B1 | 7/2002 | Lioy et al. |
| 6,434,134 B1 | 8/2002 | La Porta et al. |
| 6,487,406 B1 | 11/2002 | Chang et al. |
| 6,611,510 B2 | 8/2003 | Famolari et al. |
| 6,647,264 B1 | 11/2003 | Sasamoto |
| 6,661,999 B1 | 12/2003 | Johnson et al. |
| 6,665,537 B1 | 12/2003 | Lioy |
| 6,701,361 B1 | 3/2004 | Meier |
| 6,763,012 B1 | 7/2004 | Lord |
| 6,765,896 B1 | 7/2004 | Ahmed et al. |
| 6,775,553 B1 | 8/2004 | Lioy |
| 6,804,221 B1 * | 10/2004 | Magret et al. .................. 370/338 |
| 6,839,337 B2 | 1/2005 | Newberg et al. |
| 6,879,830 B1 | 4/2005 | Vollmer et al. |
| 6,959,009 B2 | 10/2005 | Asokan et al. |
| 6,990,090 B2 | 1/2006 | Meier |
| 7,177,292 B2 * | 2/2007 | Mizukoshi .................... 370/331 |
| 7,346,025 B2 | 3/2008 | Bryson |

FOREIGN PATENT DOCUMENTS

| | | |
|---|---|---|
| JP | 9-275399 | 10/1997 |
| JP | 10-145369 | 5/1998 |
| JP | 2000-4468 | 1/2000 |
| JP | 2000-092562 | 3/2000 |
| JP | 2001-345829 | 12/2001 |
| WO | WO 00/08822 | 2/2000 |
| WO | WO 00/18066 | 3/2000 |
| WO | WO 00/51312 | 8/2000 |
| WO | WO 00/76173 | 12/2000 |
| WO | WO 01/13660 | 2/2001 |

\* cited by examiner

WIRELESS COMMUNICATION SYSTEM AND METHOD OF CONDUCTING WIRELESS COMMUNICATION

CROSS REFERENCE TO RELATED APPLICATIONS

This application is a continuation of co-pending application Ser. No. 11/634,187 filed on Dec. 6, 2006, which is a division of Application Ser. No. 09/984,129 filed on Oct. 29, 2001, which claims foreign priority to Japanese Application No. 2000-328847 filed on Oct. 27, 2000. The entire content of each of these applications is hereby expressly incorporated by reference.

BACKGROUND OF THE INVENTION

1. Field of the Invention

The invention relates to a wireless communication system and a method of conducting wireless communication both of which allow a terminal device to make IP communication.

2. Description of the Related Art

As Internet has been widely utilized, there is a need to a communication system in which for instance, a terminal device mounted in an automobile can readily makes access to Internet.

Conventionally, in order to cause a terminal device mounted in an automobile to make access to Internet, the terminal device had to be connected to a cellular phone to make access to a router or a server (an access point) through which the cellular phone can make access to Internet through a cellular phone network.

However, the above-mentioned conventional way in which a terminal device makes access to an access point through a cellular phone network is not suitable for long time use, because a communication fee is unavoidably expensive.

If a user were driving an automobile, he/she would like to receive information about road traffic and/or navigation for arriving at his/her destination.

As a system for allowing a terminal device mounted in an automobile to make wireless communication therewith, a wireless system between a road and an automobile is presently developed. An example of such a wireless system is a system for automatically charging an automobile for a toll road fee. In the wireless system between a road and an automobile, a wireless communication device is mounted in an automobile, and a base station which can make wireless communication within a relatively narrow area is located around a tollbooth for transmitting information about a fee to automobile drivers. The wireless system is expected to further provide automobile drivers with various services including traffic information, by increasing the number of base stations.

However, since the above-mentioned wireless system is originally developed for the system for automatically charging an automobile for a toll road fee, the wireless system is designed not to have a network layer. Accordingly, the above-mentioned wireless system is accompanied with a problem that it is quite difficult or almost impossible to successively transmit IP packets to a terminal device now moving, from a plurality of base stations.

For instance, Japanese Unexamined Patent Publication No. 2000-4468 has suggested a wireless communication system in which a road and an automobile make interactive wireless communication with each other. The automobile has a wireless communication device for making wireless communication with the road. The road includes first means for detecting an automobile entering a service area covered with a plurality of micro-cells, and transmitting a detection signal, second means for receiving the detection signal and transmitting a first signal indicative of where the automobile is, a plurality of base stations each of which makes wireless communication with the wireless communication device and is associated with each of the micro-cells, and a controller which produces registration data of the automobile, based on the detection signal, transmits the registration data to the wireless communication device through the first means, and controls the base stations by switching the micro-cells, based on the first signal and the registration data.

The above-mentioned problem remains unsolved even in the above-mentioned Publication.

SUMMARY OF THE INVENTION

In view of the above-mentioned problem in the conventional wireless communication system, it is an object of the present invention to provide a wireless communication system which is capable of providing various services including Internet service, with a user such as an automobile driver.

In one aspect of the present invention, there is provided a wireless communication system including (a) a plurality of base stations each having a wireless communication device, (b) at least one mobile wireless communication device which makes wireless communication with the base stations, (c) at least one terminal device transmitting IP packets to and receiving IP packets from the mobile wireless communication device, and (d) a router through which the base stations make communication with an IP network, wherein the terminal device transmits an address thereof to the mobile wireless communication device, before the mobile wireless communication device makes link with one of the base stations, the terminal device fabricates a frame addressed to an address of the router having been received through the mobile wireless communication device, and transmits the thus fabricated frame to the router through both the mobile wireless communication device and the one of the base stations, after the mobile wireless communication device has made link with one of the base stations, the router transmits an address thereof to the base stations, before the mobile wireless communication device makes link with one of the base stations, the router fabricates a frame addressed to an address of the terminal device having been received through the one of the base stations, and transmits the thus fabricated frame to the terminal device through both the mobile wireless communication device and the one of the base stations, after the mobile wireless communication device has made link with one of the base stations.

It is preferable that the router makes wireless communication with each of the base stations through an Ethernet, and the mobile wireless communication device makes wireless communication with the terminal device through an Ethernet.

For instance, the base stations and the router defines a non-mobile network system, and the mobile wireless communication device and the terminal device defines a mobile network system.

For instance, the mobile network system is mounted in an automobile.

For instance, the wireless communication system may include a plurality of the terminal devices, and further include a second router through which the mobile wireless communication device makes IP communication with the terminal devices.

There is further provided a wireless communication system including (a) a plurality of base stations each having a wireless communication device, (b) at least one mobile wireless communication device which makes wireless communication with the base stations, (c) at least one terminal device transmitting IP packets to and receiving IP packets from the mobile wireless communication device, and (d) a router through which the base stations make communication with an IP network, wherein the terminal device informs the mobile wireless communication device that the terminal device has moved away, before the mobile wireless communication device makes link with one of the base stations, the mobile wireless communication device informs the one of the base stations that the terminal device has moved away, when the mobile wireless communication device makes link with the one of the base stations, the one of the base stations informs the router that the terminal device has moved away, after the mobile wireless communication device has made link with the one of the base stations.

There is still further provided a wireless communication system including (a) a plurality of base stations each having a wireless communication device, (b) at least one mobile wireless communication device which makes wireless communication with the base stations, (c) at least one terminal device transmitting IP packets to and receiving IP packets from the mobile wireless communication device, and (d) a router through which the base stations make communication with an IP network, wherein the terminal device transmits an address of the terminal device to the mobile wireless communication device, before the mobile wireless communication device makes link with one of the base stations, the mobile wireless communication device transmits an address of the terminal device to the one of the base stations, when the mobile wireless communication device makes link with the one of the base stations, the one of the base stations transmits an address of the terminal device to a base station or base stations to which the router makes communication with.

There is yet further provided a wireless communication system including (a) a plurality of base stations each having a wireless communication device, (b) at least one mobile wireless communication device which makes wireless communication with the base stations, (c) at least one terminal device transmitting IP packets to and receiving IP packets from the mobile wireless communication device, and (d) a router through which the base stations make communication with an IP network, wherein each of the base stations, on receipt of a broadcast packet, judges whether an address of a transmitter of the broadcast packet is an address of the router, and transmits the broadcast packet to the mobile wireless communication device with which the each of the base stations has made link, if the address of a transmitter of the broadcast packet is an address of the router.

It is preferable each of the base stations transmits the broadcast packet only to the router, if the address of a transmitter of the broadcast packet is not an address of the router.

In another aspect of the present invention, there is provided a method of conducting wireless communication in a wireless communication system including (a) a plurality of base stations each having a wireless communication device, (b) at least one mobile wireless communication device which makes wireless communication with the base stations, (c) at least one terminal device transmitting IP packets to and receiving IP packets from the mobile wireless communication device, and (d) a router through which the base stations make communication with an IP network, the method including the steps of (a) transmitting an address of the terminal device to the mobile wireless communication device from the terminal device, and transmitting an address of the router to one of the base stations from the router, before the mobile wireless communication device makes link with the one of the base stations, (b) the terminal device fabricating a frame addressed to an address of the router having been received through the mobile wireless communication device, and transmitting the thus fabricated frame to the router through both the mobile wireless communication device and the one of the base stations, after the mobile wireless communication device has made link with one of the base stations, and (c) the router fabricating a frame addressed to an address of the terminal device having been received through the one of the base stations, and transmitting the thus fabricated frame to the terminal device through both the mobile wireless communication device and the one of the base stations, after the mobile wireless communication device has made link with one of the base stations.

There is further provided a method of conducting wireless communication in a wireless communication system including (a) a plurality of base stations each having a wireless communication device, (b) at least one mobile wireless communication device which makes wireless communication with the base stations, (c) at least one terminal device transmitting IP packets to and receiving IP packets from the mobile wireless communication device, and (d) a router through which the base stations make communication with an IP network, the method including the steps of (a) the terminal device informing the mobile wireless communication device that the terminal device has moved away, before the mobile wireless communication device makes link with one of the base stations, (b) the mobile wireless communication device informing the one of the base stations that the terminal device has moved away, when the mobile wireless communication device makes link with the one of the base stations, (c) the one of the base stations informing the router that the terminal device has moved away, after the mobile wireless communication device has made link with the one of the base stations.

There is still further provided a method of conducting wireless communication in a wireless communication system including (a) a plurality of base stations each having a wireless communication device, (b) at least one mobile wireless communication device which makes wireless communication with the base stations, (c) at least one terminal device transmitting IP packets to and receiving IP packets from the mobile wireless communication device, and (d) a router through which the base stations make communication with an IP network, the method including the steps of (a) the terminal device transmitting an address thereof to the mobile wireless communication device, before the mobile wireless communication device makes link with one of the base stations, (b) the mobile wireless communication device transmitting an address of the terminal device to the one of the base stations, when the mobile wireless communication device makes link with the one of the base stations, and (c) the one of the base stations transmitting an address of the terminal device to a base station or base stations to which the router makes communication with.

There is yet further provided a method of conducting wireless communication in a wireless communication system including (a) a plurality of base stations each having a wireless communication device, (b) at least one mobile wireless communication device which makes wireless communication with the base stations, (c) at least one terminal device transmitting IP packets to and receiving IP packets from the mobile wireless communication device, and (d) a router through which the base stations make communication with an IP network, the method including the steps of (a) each of the base stations, on receipt of a broadcast packet, judging whether an address of a transmitter of the broadcast packet is an address of the router, and (b) the one of the base stations transmitting the broadcast packet to the mobile wireless communication device with which the each of the base stations has made link, if the address of a transmitter of the broadcast packet is an address of the router.

The method may further include the step of each of the base stations transmitting the broadcast packet only to the router, if the address of a transmitter of the broadcast packet is not an address of the router.

In still another aspect of the present invention, there is provided a router through which each of base stations each having a mobile wireless communication device makes wireless communication with an IP network, including (a) a first controller which transmits data including an address of the router, to the base stations, (b) a second controller which includes a routing table in which data about routes in which IP packets are transmitted to a mobile terminal device is stored, and determines destination to which IP packets are to be transmitted, and (c) a third controller which updates the routing table in accordance with data indicating that the mobile terminal device has moved away, transmitted from the mobile terminal device.

In yet another aspect of the present invention, there is provided a wireless base station which makes wireless communication with a mobile wireless communication device, including (a) an interface through which the wireless base station makes wireless communication with the mobile wireless communication device, (b) a message transceiver which transmits messages to and receives messages from a router and base stations making communication with the router, and (c) a memory which stores an address of the router, an address of a terminal device making communication with the mobile wireless communication device, and a message indicating that the terminal device has moved away.

It is preferable that the message transceiver transmits the message to the router on behalf of the terminal device, when a link between the wireless base station and the mobile wireless communication device has been established.

It is preferable that the message transceiver, on receipt of an address of the terminal device, transmits an address of the terminal device to a base station or base stations with which the router makes communication.

It is preferable that the message transceiver, on receipt of a broadcast packet, judges whether an address of a transmitter of the broadcast packet is an address of the router, and transmits the broadcast packet to the mobile wireless communication device with which the wireless base station has made link, if the address of a transmitter of the broadcast packet is an address of the router.

It is preferable that the message transceiver transmits the broadcast packet only to the router, if the address of a transmitter of the broadcast packet is not an address of the router.

In still yet another aspect of the present invention, there is provided a mobile wireless communication device capable of making wireless communication with a base station, including (a) an interface through which the mobile wireless communication device makes wireless communication with the base station, (b) a message transceiver which transmits messages to and receives messages from a terminal device which can make wireless communication with the mobile wireless communication device, and (c) a memory which stores an address of the terminal device, an address of a router, and data indicating where each of base stations is.

In still further another aspect of the present invention, there is provided a terminal device transmitting IP packets to and receiving IP packets from a mobile wireless communication device, including (a) a controller which transmits an address of the terminal device to the mobile wireless communication device, and (b) a message transceiver which transmits a message indicating that the terminal device has moved away, to the mobile wireless communication device.

The advantages obtained by the aforementioned present invention will be described hereinbelow.

In the wireless communication system, the terminal device transmits its address to the mobile wireless communication device, and the router transmits its address to the base stations, before the mobile wireless communication device makes link with one of the base stations. Once the link has been established, the terminal device fabricates a frame addressed to an address of the router having been received through the mobile wireless communication device, and transmits the thus fabricated frame to the router through both the mobile wireless communication device and the base station. Thus, the terminal device can make IP communication with others through a wireless communication system such as the above-mentioned wireless communication system between a road and an automobile. Even if the terminal device moves away and switches a base station through which the terminal device makes wireless communication, the terminal device can continue making wireless communication.

In the wireless communication system, the terminal device informs the mobile wireless communication device that the terminal device has moved away, before the mobile wireless communication device makes link with one of the base stations. The mobile wireless communication device informs the one of the base stations that the terminal device has moved away, when the mobile wireless communication device makes link with the one of the base stations. The one of the base stations informs the router on behalf of the terminal device that the terminal device has moved away, after the mobile wireless communication device has made link with the one of the base stations. The router can shorten time required to deal with the information that the terminal device has moved away. In addition, it is no longer necessary for the terminal device to inform the router that the terminal device has moved away, ensuring that it is no longer necessary for the mobile wireless communication device and the base stations to transmit such information therethrough.

In the wireless communication system, the terminal device transmits its address to the mobile wireless communication device, before the mobile wireless communication device makes link with one of the base stations, and the mobile wireless communication device transmits an address of the terminal device to the one of the base stations, when the mobile wireless communication device makes link with the one of the base stations. The one of the base stations which has received an address of the terminal device transmits an address of the terminal device to a base station or base stations to which the router makes communication with. Accordingly, the base station which has first made link with the mobile wireless communication device can be aware of that the terminal device has moved away, and consequently, is no longer necessary to transmit frames to the terminal device, even if the base station receives a framed addressed to the terminal device. Hence, it is possible to avoid wasteful IP packets from being transmitted through the wireless communication system.

In the wireless communication system, each of the base stations, on receipt of a broadcast packet, judges whether an address of a transmitter of the broadcast packet is an address of the router. The each of the base stations transmits the broadcast packet to the mobile wireless communication device with which the each of the base stations has made link, if the address of a transmitter of the broadcast packet is an address of the router, whereas the each of the base stations transmits the broadcast packet only to the router, if the address of a transmitter of the broadcast packet is not an address of the router. Hence, since the broadcast packets having been transmitted from the terminal device are not transmitted to other terminal devices, it would be possible to avoid wasteful wireless communication.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
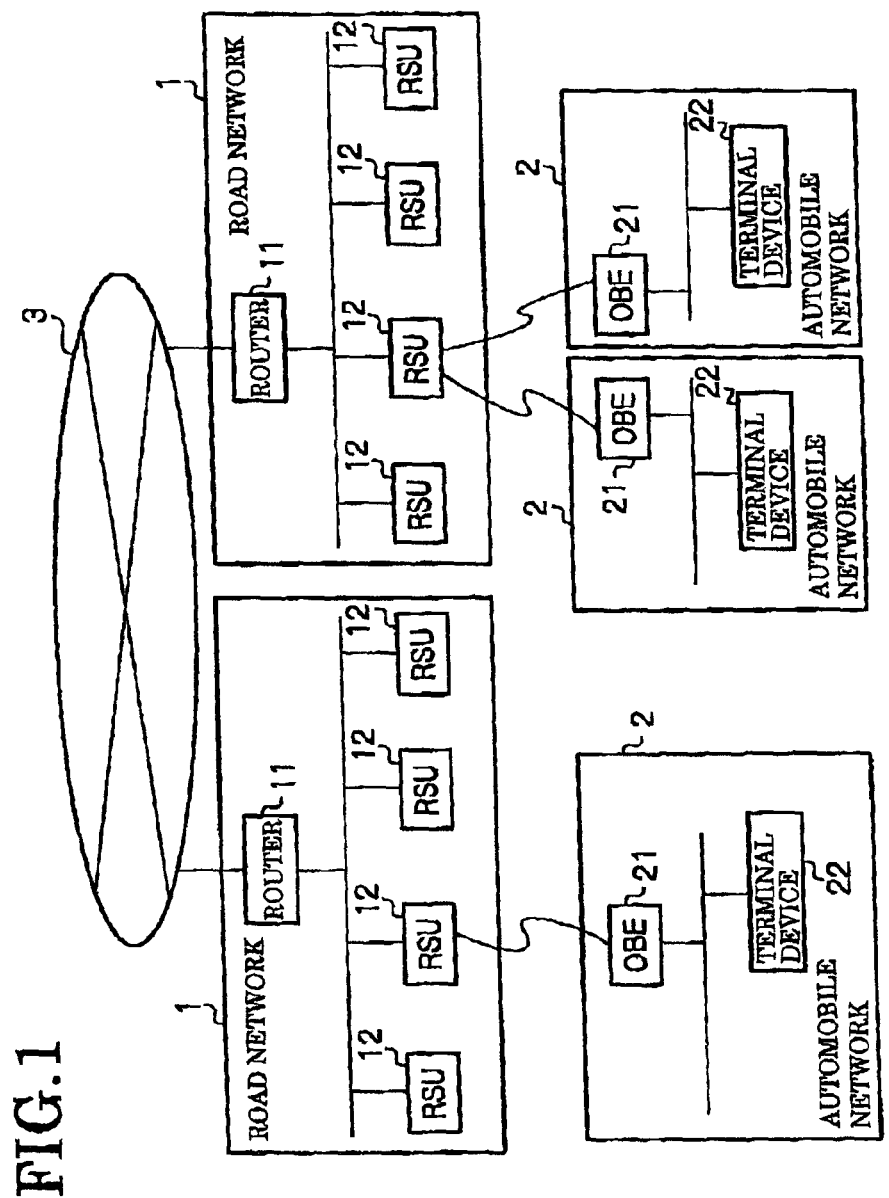
FIG. 1 is a block diagram of the wireless communication system in accordance with a preferred embodiment of the present invention.
Figure 2:
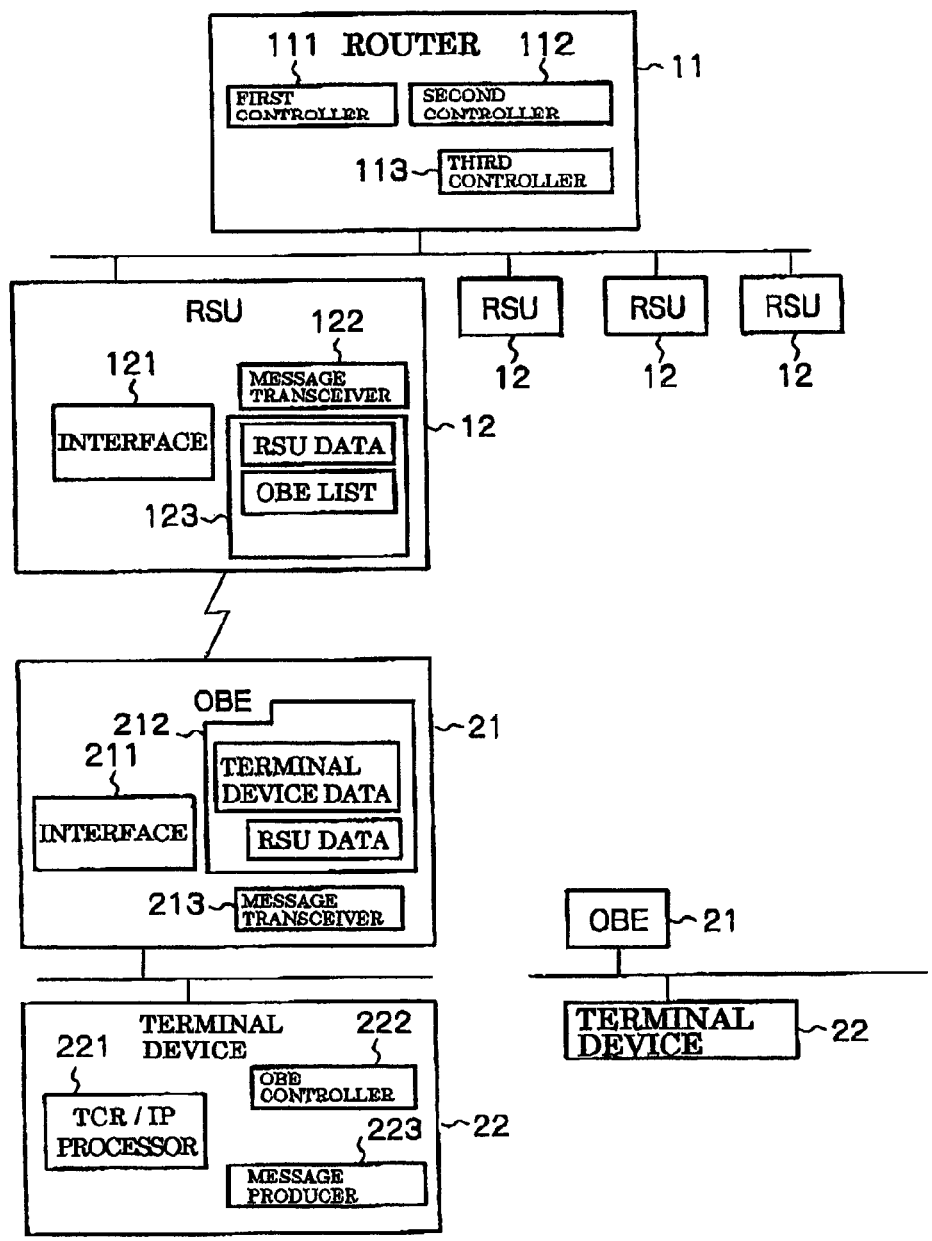
FIG. 2 is a block diagram of the router, the base station, the wireless communication device, and the terminal device all constituting the wireless communication system illustrated in FIG. 1.

FIG. 1 is a block diagram of the wireless communication system in accordance with an embodiment of the present invention, and FIG. 2 is a block diagram of the router, the base station, the wireless communication device, and the terminal device all constituting the wireless communication system illustrated in FIG. 1.

As illustrated in FIG. 1, the wireless communication system is comprised of a plurality of road networks 1 each including a wireless communication equipment equipped around a road or in a tollbooth, and a plurality of automobile networks 2 each mounted in an automobile cruising on the road.

Each of the road networks 1 is comprised of a plurality of base stations (illustrated as "RSU" in FIG. 1) 12 each including a wireless communication device, and a router 11 through which the base stations 12 make IP communication with an IP network 3.

Each of the automobile networks 2 is comprised of a wireless communication device 21 (illustrated as "OBE" in FIG. 1) mounted in an automobile for making wireless communication with the base stations 12, and a terminal device 22 or an IP node mounted in an automobile for transmitting IP packets to and receiving IP packets from the wireless communication device 21.

Each of the automobile networks 2 may be designed to include a plurality of the terminal devices 22, in which case, each of the automobile networks 2 may be designed to include a router through which the wireless communication device 21 makes IP communication with the terminal devices 22.

In the wireless communication system, the router 11 and the base stations 12 make communication with each other through Ethernet, and the wireless communication device 21 and the terminal device 22 makes communication with each other through Ethernet. In addition, the base station 12 and the wireless communication device 21 transmit frames to each other through Ethernet.

The above-mentioned wireless communication system between a road and an automobile is comprised of the wireless communication device 21 and the base station 12, in which equipments necessary for charging automobile drivers for a toll road fee are connected to the base station 12. Accordingly, the wireless communication system illustrated in FIG. 1 has a structure where the terminal device 22 is designed to make communication with the wireless communication device 21 used for the above-mentioned wireless communication system between a road and an automobile, and the base stations 12 and the router 11 are designed to make communication with each other through Ethernet to thereby allow the base stations 12 to make access to the IP network 3.

As illustrated in FIG. 2, the router 11 is comprised of a first controller 111 determining an addressee to which IP packets are to be transmitted, and including a routing table storing therein data about routes through which IP packets are transmitted, a second controller 112 which updates the routing table in accordance with a message transmitted from the terminal device 22 indicating that the terminal device 22 has moved away, and a third controller 113 transmitted certain data to the associated base stations 12.

Each of the base stations 12 is comprised of an interface 121 which includes a wireless communication equipment through which the base station 12 makes wireless communication with the wireless communication device 21, a message transceiver 122 which transmits messages to and receives messages from each of nodes which are connected to the road network 1, and a memory 123 which stores Ethernet MAC address of the router 11 and data indicative of locations of the base stations 12, as base station data (RSU data), and further stores Ethernet MAC address of the terminal device 22 and a message transmitted from the wireless communication device 21 that the terminal device 22 has moved away, as a wireless communication device list (OBE list).

The wireless communication device 21 is comprised of an interface 211 which includes a wireless communication equipment through which the wireless communication device 21 makes wireless communication with the base stations 12, a memory 212 which stores Ethernet MAC address of the terminal device 22 and a message transmitted from the wireless communication device 21 that the terminal device 22 has moved away, as terminal device data, and further stores Ethernet MAC address of the router 11 and data indicative of locations of the base stations 12, as base station data (RSU data), and a message transceiver 213 which transmits messages to and receives messages from each of nodes of the automobile network 2.

The terminal device 22 or IP node mounted in an automobile is comprised of a TCP/IP processor 221 which produces and takes IP packets into each packets, a controller 222 which produces an Ethernet frame and a particular message, and transmits them to the wireless communication device 21, and a message producer 223 which produces a message that the terminal device 22 has moved away which message is to be transmitted to the router 11.

Figure 3:
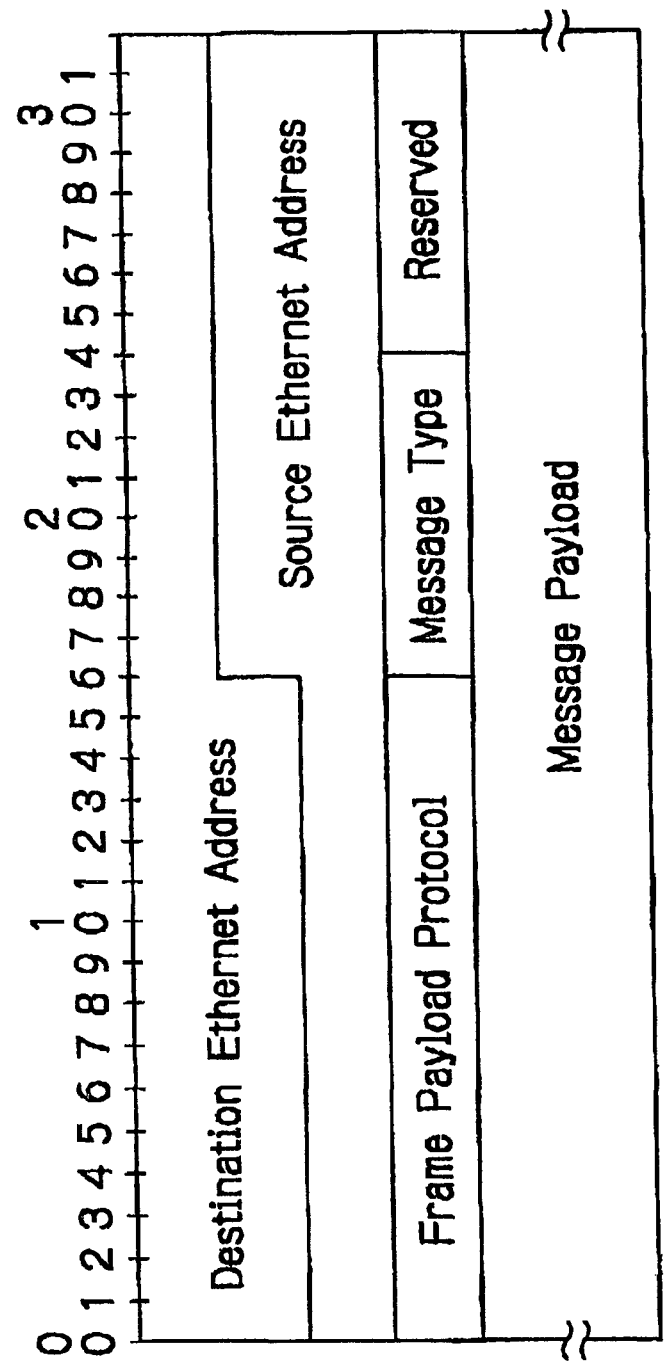
FIG. 3 shows an example of a format of a frame used in the wireless communication system.

Hereinbelow is explained a format of the particular frame which is to be transmitted among the router 11, the base stations 12, the wireless communication device 21, and the terminal device 22, with reference to FIG. 3. Herein, the particular frame means a frame including a message for controlling an operation of the router 11, the base stations 12, the wireless communication device 21, and the terminal device 22. Other frames for transmitting other information are produced in accordance with Ethernet specification, and hence, will not be explained below.

Each of the fields shown in FIG. 3 has a content as follows.

"Destination Ethernet Address": This field indicates Ethernet MAC address of an addressee.

"Source Ethernet Address": This field indicates Ethernet MAC address of an addresser.

"Frame Payload Protocol": Numbers of upper-grade protocols and predetermined numbers are inserted into this field.

"Message Type": This field indicates the number indicative of a type of the particular frame. A message to be inserted into the field "Message Payload" is determined in accordance with the number.

"Reserved": An addresser inserts "0" into this field, and an addressee disregards this field.

Figure 4:
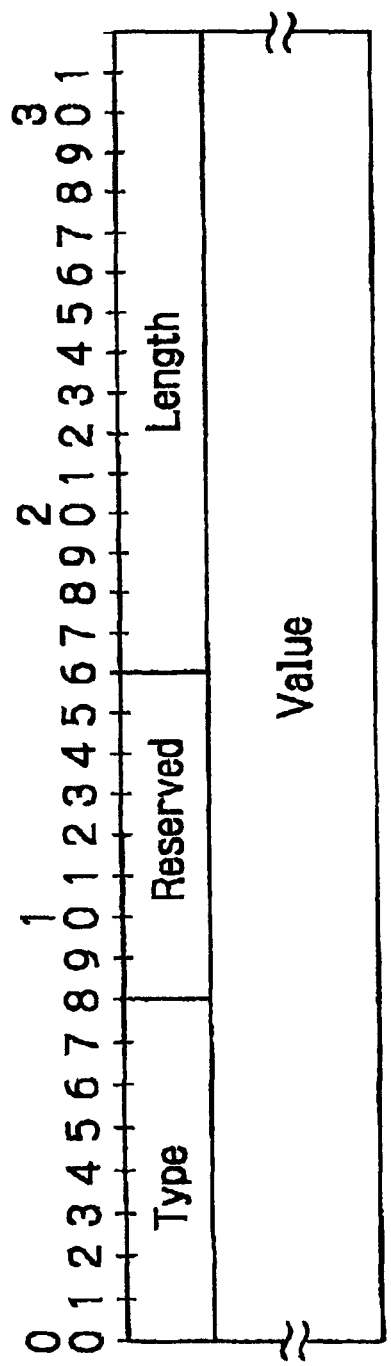
FIG. 4 shows an example of a format of the Message Payload field illustrated in FIG. 3.

"Message Payload": This field stores a message to be transmitted from or received to of the present frame. This field has a length value (TVL) type format as illustrated in FIG. 4.

Each of the fields shown in FIG. 4 has a content as follows.

"Type": Any one of figure among 0 to 255 is inserted into this field.

"Reserved": An addresser inserts "0" into this field, and an addressee disregards this field.

"Length": This field indicates a length in the range of 0 to 65535.

"Value": This field indicates a byte sequence having a length of octet, and is defined for each of "Type".

Messages is selected from the following messages A, B and C.

A. Target MAC Address:
"Type"=a predetermined number (for instance, "0x01")
"Length"=a predetermined number (for instance, "0x0006")
"Value": Ethernet MAC address is stored in this field. This field is used for transmitting Ethernet MAC addresses of the terminal device 22 and the router 11.

B. TSIP Update Message:
"Type"=a predetermined number (for instance, "0x02")
"Length"=variable
"Value": This field store a TSIP (Transport System Internet Protocol) message which the terminal device 22 requests the wireless communication device 21 to transmit on behalf thereof.

C. Base Station Information:
"Type"=a predetermined number (for instance, "0x03")
"Length"=variable
"Value": This field stores data about locations in a network in which the router 11 makes wireless communication with the base stations 12.

Hereinbelow are explained types of the particular frame and the content of the particular frames.

1. First Frame

The terminal device 22 uses this frame to inform the associated wireless communication device 21 of data necessary for the associated wireless communication device 21 to carry out certain steps, when the wireless communication device 21 and the associated base station 12 make wireless communication with each other.

"Destination Ethernet Address": This field indicates Ethernet MAC address of the wireless communication device 21

"Source Ethernet Address": This field indicates Ethernet MAC address of the terminal device 22.

"Frame Payload Protocol": This field indicates a predetermined number (for instance, "0x7137").

"Message Type": This field indicates a predetermined number. For instance, "Message Type" is defined such that the frame does not contain "TSIP Update Message" when "Message Type" is 0x00, and the frame contains "TSIP Update Message" when "Message Type" is 0x01.

"Message Field": This field includes the following messages: Target MAC Address, and TSIP Update Message.

2. Second Frame

The wireless communication device 21 uses this frame to inform the associated terminal device 22 of network information and the like, when the wireless communication device 21 makes communication with one of the base stations 12.

"Destination Ethernet Address": This field indicates Ethernet MAC address of the terminal device 22.

"Source Ethernet Address": This field indicates Ethernet MAC address of the wireless communication device 21.

"Payload Protocol": This field indicates a predetermined number (for instance, "0x7137").

"Message Type": This field indicates a predetermined number. For instance, "Message Type" is defined such that the frame did not transmit "TSIP Update Message" when "Message Type" is 0x80, and the frame transmitted "TSIP Update Message" when "Message Type" is 0x81.

"Message Field": This field includes the following messages: Target MAC Address, and Base Station Information.

3. Third Frame

When the wireless communication device 21 makes communication with one of the base stations 12, the wireless communication device 21 uses this frame to inform other base stations 12 of Ethernet MAC address of the terminal device 22 associated with the wireless communication device 21.

"Destination Ethernet Address": This field indicates Broadcast Ethernet Address (ff:ff:ff:ff:ff:ff).

"Source Ethernet Address": This field indicates Ethernet MAC address of the base station 12.

"Payload Protocol": This field indicates a predetermined number (for instance, "0x7137").

"Message Type": This field indicates a predetermined number (for instance, "0x83").

"Message Field": This field includes the following message: Target MAC Address.

4. Fourth Frame

When the wireless communication device 21 makes communication with the base station 12, the router 1 uses this frame to inform the base station 12 of information to be transmitted to the terminal device 22 from the base station 12.

"Destination Ethernet Address": This field indicates Ethernet MAC address of the base station 12.

"Source Ethernet Address": This field indicates Ethernet MAC address of the router 11.

"Payload Protocol": This field indicates a predetermined number (for instance, "0x7137").

"Message Type": This field indicates a predetermined number (for instance, "0x02").

"Message Field": This field includes the following messages: Target MAC Address, and Base Station Information.

5. Fifth Frame

This frame is a broadcast frame used by the router 11 for inquiring which base station 12 the terminal device 22 makes communication to, using Ethernet MAC address of the terminal device 22 as a retrieval key.

"Destination Ethernet Address": This field indicates Broadcast Ethernet Address (ff:ff:ff:ff:ff:ff).

"Source Ethernet Address": This field indicates Ethernet MAC address of the router 11.

"Payload Protocol": This field indicates a predetermined number (for instance, "0x7137").

"Message Type": This field indicates a predetermined number (for instance, "0x04").

"Message Field": This field includes the following message: Target MAC Address.

6. Sixth Frame

The base station 12 transmits this frame in response to the inquiry transmitted from the router 11 using the fifth frame.

"Destination Ethernet Address": This field indicates Ethernet MAC address of the router 11.

"Source Ethernet Address": This field indicates Ethernet MAC address of the base station 12 making a response.

"Payload Protocol": This field indicates a predetermined number (for instance, "0x7137").

"Message Type": This field indicates a predetermined number (for instance, "0x84").

"Message Field": This field includes the following messages: Target MAC Address.

7. Seventh Frame

The terminal device 22 uses this frame to ask the wireless communication device 21 as to whether a link between the base station 12 and the wireless communication device 21 has been established.

"Destination Ethernet Address": This field indicates Ethernet MAC address of the base station 12.

"Source Ethernet Address": This field indicates Ethernet MAC address of the terminal device 22.

"Payload Protocol": This field indicates a predetermined number (for instance, "0x7137").

"Message Type": This field indicates a predetermined number (for instance, "0x05").

"Message Field": This field does not include any messages.

8. Eighth Frame

The wireless communication device 21 uses this frame to response to an inquiry made by the terminal device 22 using the seventh frame.

"Destination Ethernet Address": This field indicates Ethernet MAC address of the terminal device 22.

"Source Ethernet Address": This field indicates Ethernet MAC address of the wireless communication device 21.

"Payload Protocol": This field indicates a predetermined number (for instance, "0x7137").

"Message Type": This field indicates a predetermined number (for instance, "0x85").

"Message Field": This field includes the following message: Target MAC Address, if a link has been established, but does not include any messages, if a link is interrupted.

9. Ninth Frame

Figure 5:
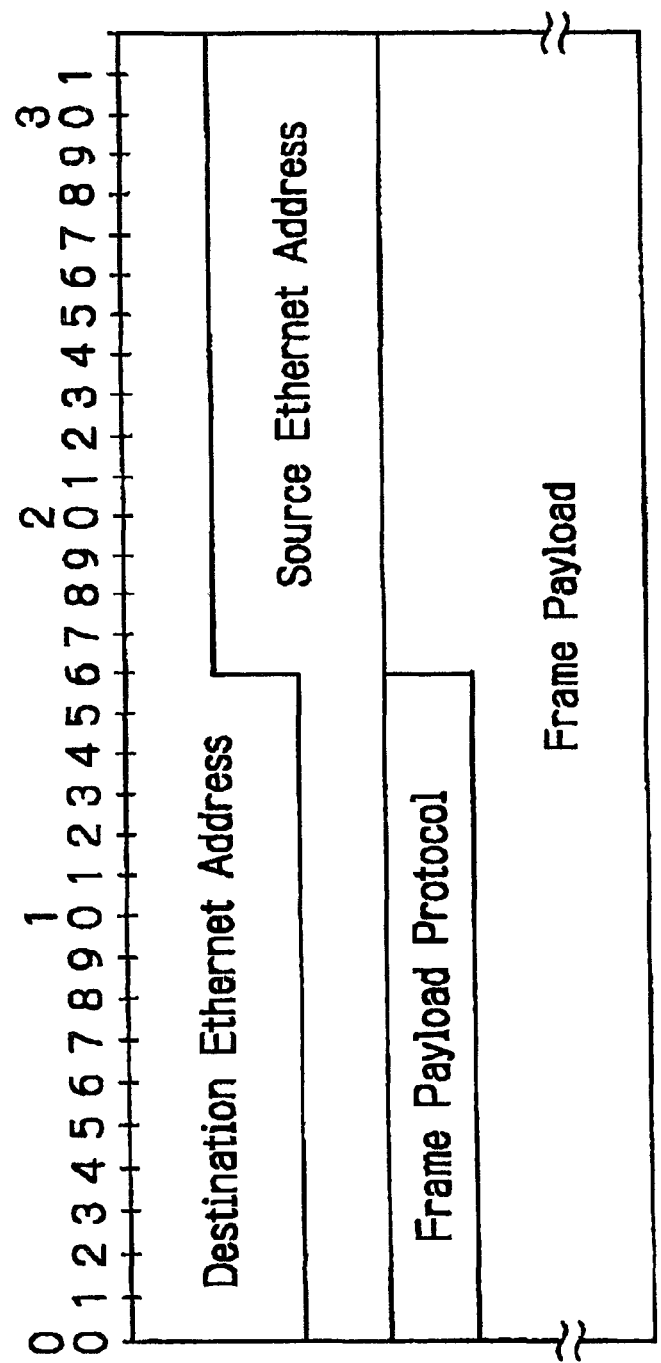
FIG. 5 shows an example of a format of a frame indicating that the terminal device has moved away which frame is to be transmitted to the router from the base station on behalf of the terminal device.

When the base station 12 transmits "TSIP Update Message" to the router 11, the base station 12 produces the ninth frame. An example of the ninth frame is illustrated in FIG. 5.

"Destination Ethernet Address": This field indicates Ethernet MAC address of the router 11.

"Source Ethernet Address": This field indicates Ethernet MAC address of the terminal device 22 which has transmitted "TSIP Update Message"

"Frame Payload Protocol": This field indicates Internet Protocol.

"Frame Payload": This field copies the "Value" field of "TSIP Update Message" which was transmitted from the wireless communication device 21 to the terminal device 22 when a link has been established, and then, transmitted from the terminal device 22.

Hereinbelow is explained functions of the wireless communication system in accordance with the embodiment.

1. Notification of Network Information

In the road network 1, the router 11 transmits the above-mentioned fourth frame to the base stations 12, just after the router 11 and the base stations 12 have been started up. Before transmitting the fourth frame, the router 11 inserts Ethernet MAC address of the router's node into Target MAC address in the fourth frame, and further inserts information about a location of the router 11 within the road network 1, into Base Station Information in the fourth frame.

On receipt of the fourth frame from the router 11, each of the base stations 12 stores the frame in the memory 123 as RSU data, and uses the thus stored RSU data to carry out later mentioned steps when the base station 12 has established a link with the wireless communication device 21. When the base station 12 receives a plurality of the fourth frames from the router 11, the base station 12 rewrites the previous fourth frame with the newly received fourth frame.

2. Reservation of Movement Notification

In the automobile network 2, the terminal device 22 transmits the above-mentioned first frame to the wireless communication device 21, just after the terminal device 22 and the wireless communication device 21 have been started up. Before transmitting the first frame, the terminal device 22 inserts Ethernet MAC address of a node of the terminal device 22 into Target MAC address of the first frame, and further inserts TSIP Update Message into the first frame, if necessary.

On receipt of the first frame from the terminal device 22, the wireless communication device 21 stores the frame in the memory 212 as terminal device data, and uses the thus stored terminal device data to carry out later mentioned steps when the wireless communication device 21 has established a link with the base station 12. When the wireless communication device 21 receives a plurality of the first frames from the terminal device 22, the base station 12 rewrites the previous first frame with the newly received first frame.

3. Establishment of Link

When the base station 12 has established a link with the wireless communication device 21, the base station 12 transmits both Ethernet MAC address of the router 11 and Base Station Information stored as RSU data, to the wireless communication device 21. The wireless communication device 21 transmits Ethernet MAC address of the terminal device stored in the memory 212 as the terminal device data, to the base station 12. If the wireless communication device 21 stores TSIP Update Message in the memory 212, the wireless communication device 21 also transmits TSIP Update Message to the base station 12.

The base station 12 stores Ethernet MAC address of the terminal device 22 having been received from the wireless communication device 21, in OBE list. If Target MAC Address included in the above-mentioned third frame received from other base station 12 includes Ethernet MAC address identical with Ethernet MAC address stored in the memory 212, Ethernet MAC address stored in the memory 212 is deleted. The base station 12 stores Ethernet MAC address of the router 11 and Base Station Information both having been received from the wireless communication device 21, in the memory 212 as RSU data.

4. Movement Notification

Once a link has been established between the base station 12 and the wireless communication device 21, the wireless communication device 21 and the base station 12 carries out the following steps.

The wireless communication device 21 transmits the above-mentioned second frame to the associated terminal device 22. The second frame indicates that a link has been established between the base station 12 and the wireless communication device 21, and includes Ethernet MAC address of the router 11 and Base Station Information both having been received from the base station 12.

The base station 12 broadcasts the third frame to the road network 1 to inform the third frame of other base stations 12. The third frame indicates that a link has been established between the base station 12 and the wireless communication device 21, and includes Ethernet MAC address of the terminal device 22 having been received from the wireless communication device 21.

If the base station 12 receives TSIP Update Message from the wireless communication device 21, the base station 12 uses data included in the field "Value", as payload, and produces an Ethernet frame in the message transceiver 122. The thus produced Ethernet frame is transmitted to the router 11.

5. Inquiry about a Location of the Terminal Device

The router 11 broadcasts the above-mentioned fifth frame to the road network 1 in order to know a base station 12 to which a certain terminal device 22 makes communication. On receipt of the fifth frame from the router 11, the base station 12 retrieves Ethernet MAC address stores in the memory 123, and, if the associated Ethernet MAC address was detected, transmits the above-mentioned sixth frame to the router 11 to inform the router 11 of the detected Ethernet MAC address.

6. Inquiry about Link Status

The terminal device 22 transmits the above-mentioned seventh frame to the wireless communication device 21 in order to know whether a link between the wireless communication device 21 and the base station 12 is established. On receipt of the seventh frame from the terminal device 22, the wireless communication device 21 checks link status, that is, whether the link is established or interrupted, and transmits the above-mentioned eighth frame to the terminal device 22.

If the link is established between the wireless communication device 21 and the base station 12, the wireless communication device 21 transmits the eighth frame where Ethernet MAC address of the router 11 having been received from the base station 12 when the link has been established is inserted into Target MAC Address. If the link is interrupted, nothing is inserted into Target MAC Address in the eighth frame.

7. Transfer of Regular IP Packet Addressed to the Terminal Device

The Ethernet frame including IP packets, transmitted from the router 11 and addressed to the terminal device 22, is transferred as follows.

(A) Single Address

Each of the base stations 12 in the road network 1 monitors frames transmitted through the road network 1. For instance, an Ethernet frame is addressed to a terminal device having Ethernet MAC address "MM", the base station 12 which stores the Ethernet MAC address "MM" in OBE list captures the Ethernet frame having the field "Destination Address" into which the Ethernet MAC address "MM" is inserted. The captured Ethernet frame is transferred to the wireless communication device 21 in the automobile network 2 including the terminal device 22 as the addressee, and then, further transferred to the terminal device 22 having Ethernet MAC address "MM".

(B) A Plurality of Addresses

For instance, a multicast or broadcast Ethernet frame transmitted from the router 11 is captured by all the base stations 12 associated with the router 11, and then, transferred to each of the wireless communication devices 21 associated with each of the base stations 12. The Ethernet frame having been transferred to the wireless communication device 21 is then transferred to the terminal device 22 or terminal devices 22 associated with the wireless communication device 21.

If the router 11 transmitted a broadcast Ethernet frame, all of the terminal devices 22 receive the frame. In contrast, if the router 11 transmitted a multicast Ethernet frame, only the terminal device 22 designated by Ethernet MAC address receives the frame, in which case, the terminal devices 22 not designated by Ethernet MAC address disregards the frame.

A multicast or broadcast Ethernet frame transmitted from nodes other than the router 11 is not transferred to the wireless communication device 21 and the terminal device 22.

8. Transfer of Regular IP Packet Addressed to the Router

An Ethernet frame including IP packets transmitted from the terminal device 22 and addressed to the router 11 is transferred as follows.

(A) Single Address

The wireless communication device 21 monitors frames transmitted through the automobile network 2, and captures Ethernet frame transmitted from the terminal device 22. The captured Ethernet frame is transferred to the base station 12 which has already established a link with the wireless communication device 21, and then, is further transferred to the router 11 from the base station 12.

(B) A Plurality of Addresses

A multicast or broadcast Ethernet frame transmitted from the terminal device 22 is captured by the wireless communication device 21, and then, is further transferred to the base station 12 which has already established a link with the wireless communication device 21. Then, the base station 12 transfers the received Ethernet frame to the router 11.

If a received frame is a multicast or broadcast Ethernet frame, the base station 12 does not transfer the received frame to other base stations 12 belonging to the road network 1.

Hereinbelow is explained in detail an operation of the wireless communication system in accordance with the embodiment with reference to FIGS. 6 to 9.

Figure 6:
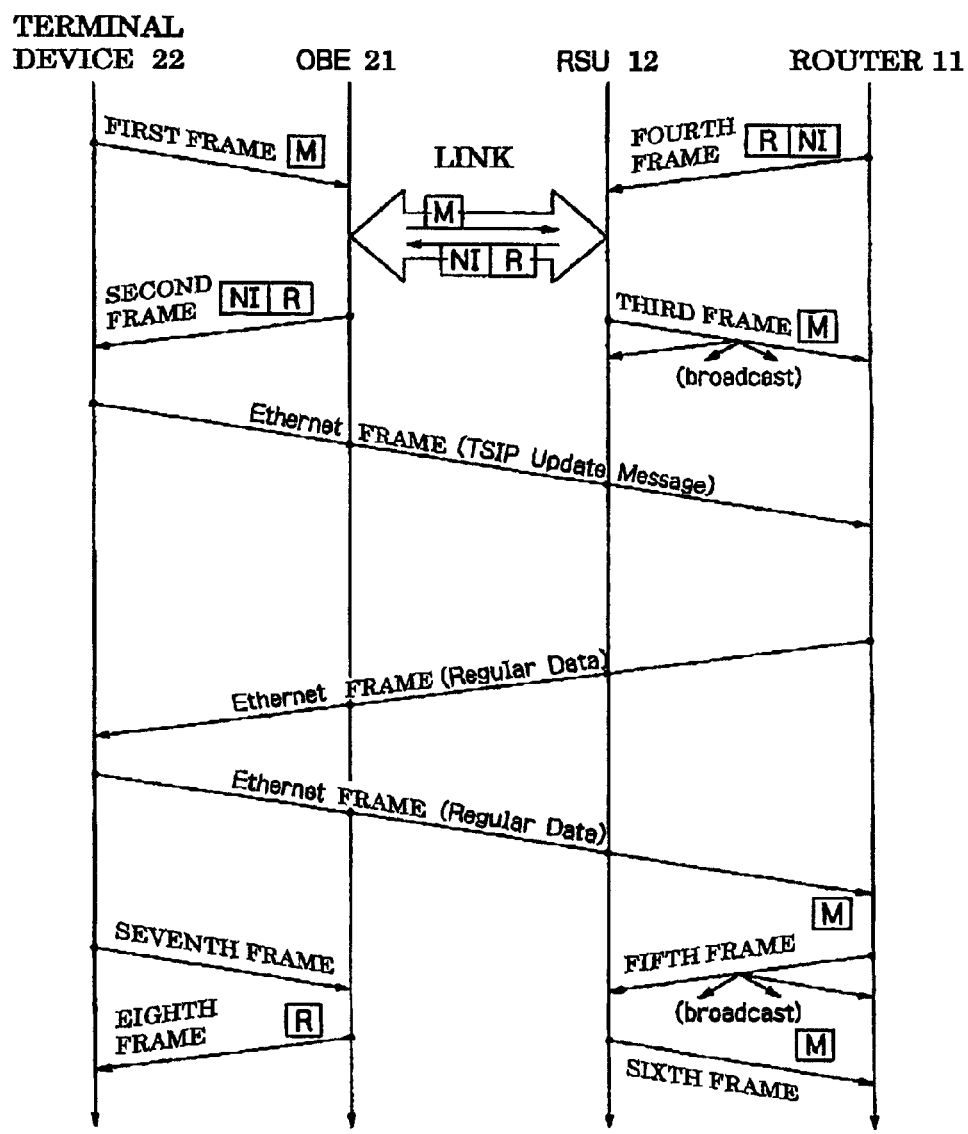
FIG. 6 is a sequence chart showing an operation of the wireless communication system.
Figure 7:
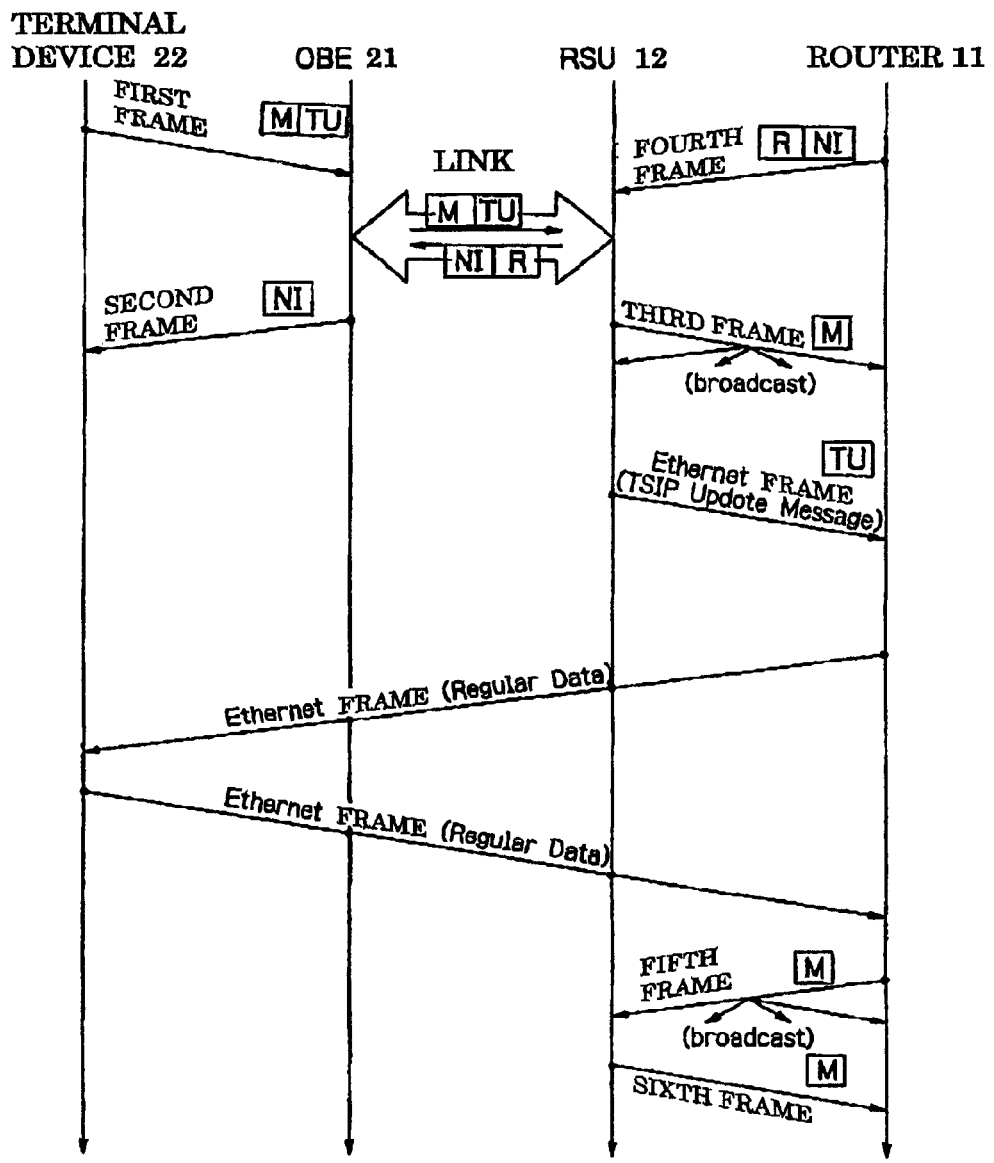
FIG. 7 is a sequence chart showing an operation of transmitting a frame indicating that the terminal device has moved away, to the router from the base station.
Figure 8:
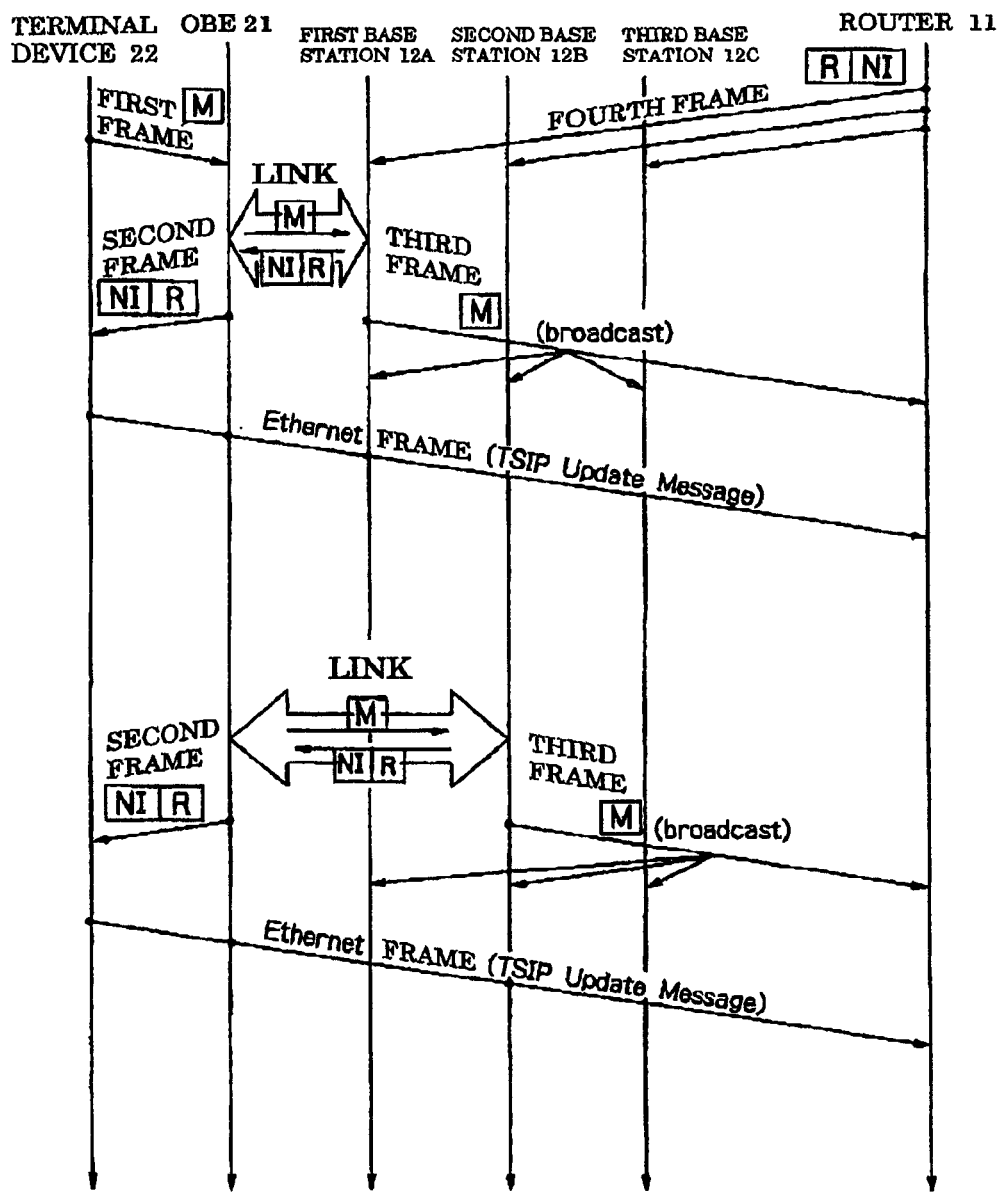
FIG. 8 is a sequence chart showing an operation to be carried out when the terminal device makes wireless communication with the router through a plurality of base stations.
Figure 9:
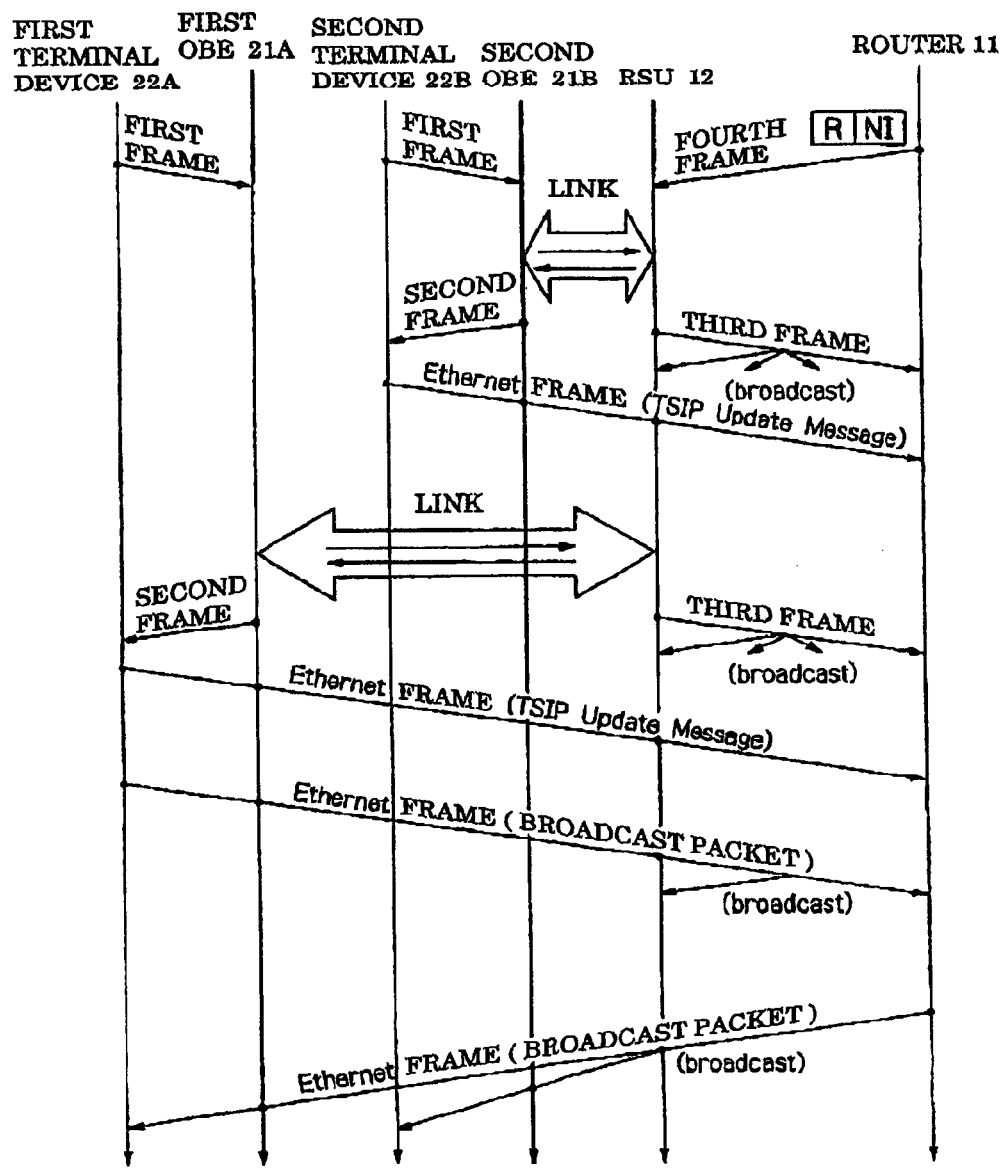
FIG. 9 is a sequence chart showing an operation to be carried out when a plurality of the automobile networks makes wireless communication with the router through the base station.

FIG. 6 is a sequence chart showing steps to be carried out in the wireless communication system, FIG. 7 is a sequence chart showing an operation of transmitting a frame indicating that the terminal device has moved away, to the router 11 from the base station 12, FIG. 8 is a sequence chart showing an operation to be carried out when the terminal device 22 makes wireless communication with the router 11 through a plurality of the base stations 12, and FIG. 9 is a sequence chart showing an operation to be carried out when a plurality of the automobile networks 2 makes wireless communication with the router 11 through the base station 12.

First, steps to be carried out when a certain terminal device 22 makes IP communication with the router 11 are explained hereinbelow with reference to FIGS. 6 and 7.

In FIGS. 6 and 7, letters encircled with a square indicate a type of a message to be added to a particular frame. Specifically, "M" indicates "Target MAC Address", "R" indicates "Target MAC Address", "NI" indicates "Base Station Information", and "TU" indicates "TSIP Update Message". More particularly, in the example explained hereinbelow, "M" indicates Ethernet MAC address of the terminal device 22, and "R" indicates Ethernet MAC address of the router 11. "Regular Data" indicates data comprised of IP packets transmitted between the terminal device 22 and the router 11.

With reference to FIG. 6, the terminal device 22 produces the above-mentioned first frame into which the controller 222 inserts Ethernet MAC address (for instance, Address M) of the terminal device 22 as "Target MAC Address", and transmits the first frame to the wireless communication device 21 in the automobile network 2 to which the terminal device 22 belongs. The wireless communication device 21 receives the first frame at the message transceiver 213, and stores the Ethernet MAC address (for instance, Address M) in the memory 212 as terminal device data.

The router 11 determines Ethernet MAC address (for instance, Address R) as "Target MAC Address" for itself in the third controller 113. Then, the router 11 fabricates the above-mentioned fourth frame into which data about a location of each of the base stations 12 is inserted as "Base Station Information", and transmits the fourth frame to each of the base stations 12. Each of the base stations 12 receives the fourth frame at the message transceiver 122, and stores the Ethernet MAC address (Address R) of the router 11 and "Base Station Information" in the memory 123 as RSU data.

When a link is established between the base station 12 and the wireless communication device 21, the base station 12 transmits the received Ethernet MAC address (Address R) of the router 11 and "Base Station Information" to the wireless communication device 21. The wireless communication device 21 transmits the Ethernet MAC address (Address M) of the terminal device 22 having been received as the first frame, to the base station 12.

The base station 12 stores the Ethernet MAC address (Address M) of the terminal device 22 having been received from the terminal device 22, in the memory 123 as OBE list.

The wireless communication device 21 stores the Ethernet MAC address (Address R) of the router 11 and "Base Station Information" both having been received from the base station 12, in the memory 212 as RSU data.

Once a link between the base station 12 and the wireless communication device 21 has been established, the wireless communication device 21 fabricates the above-mentioned second frame in which the Ethernet MAC address (Address R) of the router 11 and "Base Station Information" both stored in the memory 212 by the message transceiver 213 are inserted into "Target MAC Address", and transmits the thus fabricated second frame to the terminal devices 22 associated with the wireless communication device 21.

The base station 12 fabricates the above-mentioned third frame in which the Ethernet MAC address (Address M) of the terminal device 22, stored in the memory 123, is inserted into "Target MAC Address", and broadcasts the thus fabricated third frame to other base stations 12 through the road network 1.

Under the above-mentioned condition, an Ethernet frame including Regular Data is transmitted between the terminal device 22 and the router 11.

If the automobile network 2 including the terminal device 22 moves away, the message producer 223 in the terminal device 22 fabricates an Ethernet frame (hereinafter, referred to as "movement notification frame") including "TSIP Update Message", and transmits the thus fabricated movement notification frame to the router 11 through the wireless communication device 21 and the base station 12. The router 11 receives the movement notification frame at the second controller 112. The second controller 112 updates the routing table in accordance with the received movement notification frame.

As illustrated in FIG. 7, the terminal device 22 may insert not only the Ethernet MAC address (Address M), but also "TSIP Update Message" into the first frame, and transmit the first frame to the wireless communication device 21. In such a case, if the wireless communication device 21 transmits both the Ethernet MAC address of the terminal device 22 and "TSIP Update Message" to the base station 12 when a link has been established between the wireless communication device 21 and the base station 12, the base station 12 could transmit "TSIP Update Message" to the router 11 on behalf of the terminal device 22, using a frame having the format illustrated in FIG. 5. This enables the router 11 to shorten a time necessary for processing the movement notification transmitted from the terminal device 22.

If the terminal device 22 transmits the above-mentioned seventh frame to the wireless communication device 21 from the controller 222 in order to know whether the wireless communication device 21 has established a link with any one of the base stations 12, the wireless communication device 21 checks whether a link with any one of the base stations 12 is established, and transmits the above-mentioned eighth frame to the terminal device 22, if the link has been established. In the eighth frame, the Ethernet MAC address of the router 11 is included in "Target MAC Address".

If the router 11 broadcasts the above-mentioned fifth frame to the road network 1 in order to know a base station 12 which can make communication with any one of the terminal devices 22, where the Ethernet MAC address (for instance, Address M) of the terminal device 22 is inserted into "Target MAC Address", the base station 12 making communication with the road network 1 checks its OBE list as to whether the Ethernet MAC address is stored therein. The base station 12 having OBE list in which Address M is stored transmits the above-mentioned sixth frame to the router 11.

By carrying out such steps as mentioned above, the terminal device 22 can make IP communication with other terminal devices. The terminal device 22 can continue making IP communication, even if the terminal device 22 moves away, and hence, makes IP communication through another base station.

Hereinbelow is explained an operation to be carried out when the terminal device 22 moves away over a plurality of the base stations 12, with reference to FIG. 8.

Though FIG. 8 shows an example in which the terminal device 22 moves away over the first to third base stations 12A to 12C, the number of the base stations is not limited to three, but may be two or four or greater. FIG. 8 shows an operation to be carried out when the terminal device 22 transmits a movement notification frame to the router 11, similarly to FIG. 6, but the base station 12 may transmit the frame to the router 11 on behalf of the terminal device 22, similarly to FIG. 7.

With reference to FIG. 8, the terminal device 22 produces the above-mentioned first frame into which the controller 222 inserts Ethernet MAC address (for instance, Address M) of the terminal device 22 as "Target MAC Address", and transmits the first frame to the wireless communication device 21 in the automobile network 2 to which the terminal device 22 belongs. The wireless communication device 21 receives the first frame at the message transceiver 213, and stores the Ethernet MAC address (for instance, Address M) in the memory 212 as terminal device data.

The router 11 determines Ethernet MAC address (for instance, Address R) as "Target MAC Address" for itself in the third controller 113. Then, the router 11 fabricates the above-mentioned fourth frame into which data about a location of each of the base stations 12 is inserted as "Base Station Information", and transmits the fourth frame to each of the first to third base stations 12A to 12C.

Each of the first to third base stations 12A to 12C receives the fourth frame at the message transceiver 122, and stores the Ethernet MAC address (Address R) of the router 11 and "Base Station Information" in the memory 123 as RSU data.

When a link is established between the first base station 12A and the wireless communication device 21, the first base station 12A transmits the received Ethernet MAC address (Address R) of the router 11 and "Base Station Information" to the wireless communication device 21. The wireless communication device 21 transmits the Ethernet MAC address (Address M) of the terminal device 22 having been received as the first frame, to the first base station 12A.

The first base station 12A stores the Ethernet MAC address (Address M) of the terminal device 22 having been received from the terminal device 22, in the memory 123 as OBE list.

The wireless communication device 21 stores the Ethernet MAC address (Address R) of the router 11 and "Base Station Information" both having been received from the first base station 12A, in the memory 212 as RSU data.

Once a link between the first base station 12A and the wireless communication device 21 has been established, the wireless communication device 21 fabricates the above-mentioned second frame in which the Ethernet MAC address (Address R) of the router 11 and "Base Station Information" both stored in the memory 212 by the message transceiver 213 are inserted into "Target MAC Address", and transmits the thus fabricated second frame to the terminal devices 22 associated with the wireless communication device 21.

The first base station 12A fabricates the above-mentioned third frame in which the Ethernet MAC address (Address M) of the terminal device 22, stored in the memory 123, is inserted into "Target MAC Address", and broadcasts the thus fabricated third frame to the second and third base stations 12B and 12C through the road network 1.

If the automobile network 2 including the terminal device 22 and the wireless communication device 21 moves away, the message producer 223 in the terminal device 22 fabricates the movement notification frame including "TSIP Update Message", and transmits the thus fabricated movement notification frame to the router 11 through the wireless communication device 21 and the first base station 12A. The router 11 receives the movement notification frame at the second controller 112. The second controller 112 updates the routing table in accordance with the received movement notification frame.

When the terminal device 22 enters an area covered by the second base station 12B, the same steps as mentioned above are carried out.

When a link is established between the second base station 12B and the wireless communication device 21, the second base station 12B transmits the received Ethernet MAC address (Address R) of the router 11 and "Base Station Information" both included in the fourth frame, to the wireless communication device 21. The wireless communication device 21 transmits the Ethernet MAC address (Address M) of the terminal device 22 having been received as the first frame, to the second base station 12B.

The second base station 12B stores the Ethernet MAC address (Address M) of the terminal device 22 having been received from the wireless communication device 21, in the memory 123 as OBE list.

The wireless communication device 21 stores the Ethernet MAC address (Address R) of the router 11 and "Base Station Information" both having been received from the second base station 12B, in the memory 212 as RSU data.

Once a link between the second base station 12B and the wireless communication device 21 has been established, the wireless communication device 21 fabricates the above-mentioned second frame in which the Ethernet MAC address (Address R) of the router 11 and "Base Station Information" both stored in the memory 212 by the message transceiver 213 are inserted into "Target MAC Address", and transmits the thus fabricated second frame to the terminal devices 22 associated with the wireless communication device 21.

The second base station 12B fabricates the above-mentioned third frame in which the Ethernet MAC address (Address M) of the terminal device 22, stored in the memory 123, is inserted into "Target MAC Address", and broadcasts the thus fabricated third frame to the first and third base stations 12A and 12C through the road network 1.

At that time, since the first base station 12A which has already established a link with the wireless communication device 21 detects that the terminal device 22 having Address M has moved away to an area covered by the second station 12B, the first base station 12A would no longer transmit Ethernet frames to the terminal device 22, even if Ethernet frames addressed to Address M were transferred to the first base station 12A. Hence, it is possible to avoid wasteful IP packets from being transmitted through the wireless communication system.

Hereinbelow is explained an operation to be carried out when a plurality of the terminal devices 22 make communication with one base station 12, with reference to FIG. 9. Though FIG. 9 shows an operation where first and second terminal devices 22A and 22B make communication with the base station 12, the number of the terminal devices 22 is not limited to two, but may be three or more. FIG. 9 shows an operation to be carried out when the terminal device 22 transmits the movement notification frame to the router 11, similarly to FIG. 6, but the base station 12 may transmit the movement notification frame to the router 11 on behalf of the terminal device 22, similarly to FIG. 7.

With reference to FIG. 9, the first terminal device 22A produces the above-mentioned first frame into which the controller 222 inserts Ethernet MAC address of the first terminal device 22A as "Target MAC Address", and transmits the first frame to the first wireless communication device 21A in the automobile network 2 to which the first terminal device 22A belongs. The first wireless communication device 21A receives the first frame at the message transceiver 213, and stores the Ethernet MAC address of the first terminal device 22A in the memory 212 as terminal device data.

The second terminal device 22B produces the first frame into which the controller 222 inserts Ethernet MAC address of the second terminal device 22B as "Target MAC Address", and transmits the first frame to the second wireless communication device 21B in the automobile network 2 to which the second terminal device 22B belongs. The second wireless communication device 21B receives the first frame at the message transceiver 213, and stores the Ethernet MAC address of the second terminal device 22B in the memory 212 as terminal device data.

The router 11 determines Ethernet MAC address (for instance, Address R) as "Target MAC Address" for itself in the third controller 113. Then, the router 11 fabricates the above-mentioned fourth frame into which data about a location of each of the base stations 12 is inserted as "Base Station Information", and transmits the fourth frame to the base station 12 in the road network 1 to which the router 11 belongs.

The base station 12 receives the fourth frame at the message transceiver 122, and stores the Ethernet MAC address (Address R) of the router 11 and "Base Station Information" in the memory 123 as RSU data.

When a link is established between the base station 12 and the second wireless communication device 21B, the base station 12 transmits the received Ethernet MAC address (Address R) of the router 11 and "Base Station Information" to the second wireless communication device 21B. The second wireless communication device 21B transmits the Ethernet MAC address of the second terminal device 22B having been received as the first frame, to the base station 12.

The base station 12 stores the Ethernet MAC address of the second terminal device 22B having been received from the second wireless communication device 21B, in the memory 123 as OBE list. The second wireless communication device 21B stores the Ethernet MAC address (Address R) of the router 11 and "Base Station Information" both having been received from the base station 12, in the memory 123 as RSU data.

Once a link between the base station 12 and the second wireless communication device 21B has been established, the second wireless communication device 21B fabricates the above-mentioned second frame in which the Ethernet MAC address (Address R) of the router 11 and "Base Station Information" both stored in the memory 212 by the message transceiver 213 are inserted into "Target MAC Address", and transmits the thus fabricated second frame to the second terminal device 22B.

The base station 12 further fabricates the above-mentioned third frame in which the Ethernet MAC address of the second terminal device 22B, stored in the memory 123, is inserted into "Target MAC Address", and broadcasts the thus fabricated third frame to other base stations 12 through the road network 1.

If the automobile network 2 including the second terminal device 22B and the second wireless communication device 21B moves away, the message producer 223 in the second terminal device 22B fabricates the movement notification frame including "TSIP Update Message", and transmits the thus fabricated movement notification frame to the router 11 through the second wireless communication device 21B and the base station 12. The router 11 receives the movement notification frame at the second controller 112. The second controller 112 updates the routing table in accordance with the received movement notification frame.

When a link is established between the base station 12 and the first wireless communication device 21A, the base station 12 transmits the received Ethernet MAC address (Address R) of the router 11 and "Base Station Information" to the first wireless communication device 21A. The first wireless communication device 21A transmits the Ethernet MAC address of the first terminal device 22A having been received as the first frame, to the base station 12.

The base station 12 stores the Ethernet MAC address of the first terminal device 22A having been received from the first wireless communication device 21A, in the memory 123 as OBE list. The first wireless communication device 21A stores the Ethernet MAC address (Address R) of the router 11 and "Base Station Information" both having been received from the base station 12, in the memory 123 as RSU data.

Once a link between the base station 12 and the first wireless communication device 21A has been established, the first wireless communication device 21A fabricates the above-mentioned second frame in which the Ethernet MAC address (Address R) of the router 11 and "Base Station Information" both stored in the memory 212 by the message transceiver 213 are inserted into "Target MAC Address", and transmits the thus fabricated second frame to the first terminal device 22A.

The base station 12 further fabricates the above-mentioned third frame in which the Ethernet MAC address of the first terminal device 22A, stored in the memory 123, is inserted into "Target MAC Address", and broadcasts the thus fabricated third frame to other base stations 12 through the road network 1.

If the automobile network 2 including the first terminal device 22A and the first wireless communication device 21A moves away, the message producer 223 in the first terminal device 22A fabricates the movement notification frame including "TSIP Update Message", and transmits the thus fabricated movement notification frame to the router 11 through the first wireless communication device 21A and the base station 12. The router 11 receives the movement notification frame at the second controller 112. The second controller 112 in the router 11 updates the routing table in accordance with the received movement notification frame.

Then, for instance, if the first terminal device 22A transmits a broadcast packet in order to know Ethernet MAC address of the router 11, the broadcast packet is received at the third controller 113 in the router 11 through the first wireless communication device 21A and the base station 12.

If the base station 12 detects that the Ethernet MAC address of a broadcast packet transmitter is not identical with the Ethernet MAC address (Address R) of the router 11, by checking RSU data, the base station 12 stops packet transmission to the terminal device 22 through the second wireless communication device 21B.

If the router 11 transmits a broadcast packet to the road network 1, each of the base stations 12 checks RSU data to know whether Ethernet MAC address of a broadcast packet transmitter and the Ethernet MAC address (Address R) of the router 11 are identical with each other. If they are identical with each other, each of the base stations 12 transmits the broadcast packet to the wireless communication devices now making communication with the base station 12.

The broadcast packets are transmitted to all of the terminal devices 22 making communication with the first and second wireless communication devices 21A and 21B. Most of the broadcast packets transmitted by the terminal device 22 is directed to the road network 1, and not to the other terminal devices 22.

Even if a broadcast packet is directed to the terminal device 22, the road network 1 can receive such a broadcast packet on behalf of the terminal device 22. Hence, broadcast packets transmitted from the terminal device 22 are not transferred to the other terminal devices 22, avoiding wasteful wireless communication.

In the explanation having been made so far, the road network 1 and the automobile network 2 are comprised of Ethernet, however, it should be noted that the networks 1 and 2 may be designed to be comprised of other interfaces.

Though the above-mentioned embodiment is a case wherein IP communication can be made in the wireless communication system between a road and an automobile, the embodiment makes it possible to make ATM communication in the wireless communication system between a road and an automobile.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-328847 on Oct. 27, 2000 including specification, claims, drawings and summary is incorporated herein by reference in its entirety.

What is claimed is:

1. A network system, comprising:
   a mobile wireless communication device;
   a wireless base station which makes wireless communication with the mobile wireless communication device; and
   a controller which controls the wireless base station; and
   wherein the wireless base station transmits data including an identifier of the mobile wireless communication device to the controller, when the wireless base station makes a link with the mobile wireless communication device,
   wherein the wireless base station stores information of the controller before the wireless base station makes the link with the mobile wireless communication device,
   wherein the information of the controller includes an address of the controller, and
   wherein the wireless base station, which receives a broadcast packet, judges whether a source address of the broadcast packet is the address of the controller, and transmits the broadcast packet to the mobile wireless communication device with which the wireless base station makes the link when the source address of the broadcast packet is the address of the controller.

2. The network system as defined in claim 1,
   wherein the wireless base station transmits the data to the controller according to a request from the mobile wireless communication device.

3. The network system as defined in claim 2,
   wherein the mobile wireless communication device sends a message indicating that the mobile wireless communication device requests the wireless base station to transmit the data, and
   wherein the wireless base station transmits the data to the controller when the wireless base station receives the message.

4. The network system as defined in claim 1,
   wherein the wireless base station transmits the broadcast packet to the controller when the source address of the broadcast packet is not the address of the controller.

5. A wireless base station which is controlled by a controller, comprising:
   an interface which makes wireless communication with a mobile wireless communication device;
   a transceiver which transmits data including an identifier of the mobile wireless communication device to the controller, when the interface makes a link with the mobile wireless communication device; and
   a memory which stores information of the controller before the interface makes the link with the mobile wireless communication device,
   wherein the information of the controller includes an address of the controller, and
   wherein the transceiver, which receives a broadcast packet, judges whether a source address of the broadcast packet is the address of the controller, and transmits the broadcast packet to the mobile wireless communication device with which the interface makes the link when the source address of the broadcast packet is the address of the controller.

6. The wireless base station as defined in claim 5,
   wherein the transceiver transmits the data to the controller according to a request from the mobile wireless communication device.

7. The wireless base station as defined in claim 6,
   wherein the interface receives a message indicating that the mobile wireless communication device requests the wireless base station to transmit the data, and
   wherein the transceiver transmits the data to the controller when the interface receives the message.

8. The wireless base station as defined in claim 5,
   wherein the transceiver transmits the broadcast packet to the controller when the source address of the broadcast packet is not the address of the controller.

9. A method, comprising:
   establishing a link between a wireless base station and a mobile wireless communication device;
   transmitting data including an identifier of the mobile wireless communication device from the wireless base station to a controller which controls the wireless base station, when the link has been established; and
   at the wireless base station, storing information of the controller before the wireless base station makes the link with the mobile wireless communication device,
   wherein the information of the controller includes an address of the controller, and
   wherein the wireless base station, which receives a broadcast packet, judges whether a source address of the broadcast packet is the address of the controller, and transmits the broadcast packet to the mobile wireless communication device with which the wireless base station makes the link when the source address of the broadcast packet is the address of the controller.

10. The method as defined in claim 9,
    wherein the step of transmitting the data comprises transmitting the data from the wireless base station to the controller according to a request from the mobile wireless communication device.

11. The method as defined in claim 10, further comprising the step of:
    sending a message from the mobile wireless communication device to the wireless base station, wherein the message indicates that the mobile wireless communication device requests the wireless base station to transmit the data, and
    wherein the step of transmitting the data comprises transmitting the data from the wireless base station to the controller when the wireless base station receives the message.

12. The method as defined in claim 9,
    wherein the wireless base station transmits the broadcast packet to the controller when the source address of the broadcast packet is not the address of the controller.

* * * * *